2,829,987
PROCESS FOR FRACTIONATING STARCH

Willem Christiaan Bus, The Hague, Johannes Muetgeert, Rotterdam, and Pieter Hiemstra, Delft, Netherlands, assignors to Cooperatieve Verkoop- en Productievereniging van Aardappelmeel en Derivaten "Avebe" G. A., Veendam, Netherlands No Drawing. Application December 12, 1952
Serial No. 325,698

Claims priority, application Netherlands December 15, 1951

11 Claims. (Cl. 127—71)

Most natural starches are now considered as mixtures of at least two components; one fraction mainly consists of linear molecules and is referred to as amylose or as A-fraction and the other is of branched molecular configuration and is named amylopectin or the B-fraction.

It is the principal object of the present invention to provide a new process for fractionating starch into these two components.

It is a further object of the present invention to prevent colouring of the starch fractions during fractionation.

Various processes have been proposed for the fractionation of starch solutions into the two components amylose and amylopectin. The older methods are not suitable for practical manufacturing processes; only the process according to Schoch known from the United States patent specification 2,515,095 may be applied in practice. According to this method a warm, clear and diluted starch solution is prepared by heating starch together with a solution of 10–30% of a mixture of aliphatic alcohols with 1–5 carbon atoms in water in an autoclave at e. g. 120° C. On slowly cooling unto room temperature the amylose precipitates and can be separated from the solution by supercentrifuging. On further cooling the amylopectin may be precipitated. Drawbacks of this method are that costs of the supercentrifuge are extremely high and that the purity of the amylose is at the best 75%. For a further purification of the amylose repeated dissolution and crystallization from water alcohol mixutres as used for the first separation is essential.

In Pflügers Archiv für Ges. Phys. 196, 92 (1922), a method is described for controlling the progress of hydrolysis in starch by salting out the starch out of a 1% dispersion in water with $MgSO_4(NH_4)_2SO_4$ or $Na_2SO_4$. Any indication that the starch can be fractionated into two fractions of a different structure by addition of these salts is not to be found in this publication.

We have now found that by dissolving starch under pressure in an aqueous solution of a salt which in high concentration is capable of precipitating starch from an aqueous solution and cooling said first mentioned solution, amylose can be precipitated in a form permitting easy separation of precipitate and liquid. The amylopectin fraction can also easily be separated out from the solution by further cooling.

Several types of starch may be used, as e. g. corn starch, wheat starch, potato starch, tapioca starch and pea starch. Sometimes it is preferred to defat the starch before the dissolution; potato starch has the advantage that no defatting is necesary. The concentration of the salt has to be more than 5% and preferably between 10–20% by weight of the anhydrous salt. If the salt concentration is less than 5% by weight of the anhydrous salt, the amylose is precipitated by cooling to temperatures of about 20° C. or lower for a considerable time as e. g. 24 hours, but the precipitation of the amylopectin from the remaining liquid cannot be obtained only by cooling. If the amylopectin has to be separated, this may be performed by freezing and unfreezing or by precipitation with an alcohol or another similar water miscible organic liquid.

Very good results were obtained with 3–8% of starch, dissolved in an aqueous magnesium sulfate solution having a concentration of 20–30 g. $MgSO_4$.7 aq. per 100 cc. solution, and also with concentrated solutions of $(NH_4)_2SO_4$, $Na_2SO_4$ and with mixtures of these salts.

The temperature at which the starch is dissolved is preferably higher than 115° C. At temperatures of 120–125° C. good results were obtained. At higher temperatures, e. g. 150–160° C. the dissolving is accomplished in much less time, which has the advantage that the hydrolysis of the starch is less than if dissolving at temperatures of about 120° C., resulting in a higher molecular weight and easier separation of the fractions in the following fractionation process. However, a disadvantage of such higher temperatures is the formation of dark coloured products during the dissolving process, especially when working in a continuous process.

We have found, however, that the undesired colouring can be efficaciously prevented by adding small quantities of reducing substances to the dissolving medium; said substances must by itself be stable in aqueous solutions at the chosen dissolving temperature of the starch. The quantities of these reducing substances, such as sodiumsulfite and sodiumthiosulfate, necessary to give a good protection may be substantially less than the quantity which corresponds with the quantity of oxygen present in the liquid and autoclave. So e. g. 0.006% $Na_2SO_3$ was sufficient to prevent colouring of starch when dissolving this in an aqueous solution of $MgSO_4$, while the quantity of oxygen present could bind about 0.1%. In general quantities of less than 1% by weight of the solution are sufficient.

Especially advantageous is the low viscosity of the starch solutions prepared according to the invention compared to a starch in water solution with the same starch content; as appears from molecular weight measurements this low viscosity does not result from starch destruction. Consequently it is possible to work with solutions containing e. g. up to 20% by weight of starch, which is quite impossible with the usual processes, and thus process costs may be substantially decreased. If the starch concentrations of more than 8%, as e. g. 15%, are employed, the salt concentration of the solution may be lower than with a starch concentration of 8% or less.

The process may also be performed by adding a small quantity of an organic compound which is capable of precipitating amylose from aqueous starch solutions, as e. g. a water immiscible alcohol, to the MgSO₄ solution. The desirable concentrations of this organic compound, which compounds are described in our co-pending patent application Ser. No. 293,214, now Patent No. 2,803,568, however, are substantially less than the concentrations used according to the U. S. patent specification 2,515,095 and also less than the optimal concentrations as mentioned in the United States patent application Ser. No. 293,214. On account of this addition of an organic compound the amylose precipitate can even easier be separated from the mother lye, and on further cooling the amylopectin also precipitates. As a result after the separation of precipitate and mother lye the mother lye can again be use for dissolving starch under pressure. Generally no higher quantities of organic compound are used than 5% by volume. Suitable organic compounds include amyl, capryl and butyl alcohols and di-isopropyl ketone.

It is a further great advantage of the use of MgSO₄ to the Schoch process that the separation of amylopectin occurs within a very short time, viz. about half an hour, whereas for a complete precipitation in a water alcohol mixture according to Schoch a 12 hours' cooling unto about 0° C. is necessary.

The simultaneous use of both MgSO₄ and an organic compound has some advantages with regard to the single use of these components. The advantages may result from a better yield and a greater purity of the fractions, while consequently the velocity of amylose-separation also improves in comparison with the separation from a solution containing but one of the additions.

The form of the precipitates is very favourable when using MgSO₄.7 aq. in concentrations of 24–27 percent by weight as solvent for 3–8% of starch because the separation of the precipitates and the mother lye can occur with an ordinary drum centrifuge for the amylose and even with a filter press for the amylopectin.

The yield of amylose and the purity of it depends on the concentration of MgSO₄, of the alcohol and the concentration of the starch.

The separated precipitates still contain mother lye and consequently the substances dissolved in it. The amylose-precipitate can be purified by washing, if necessary after pressing or after any other concentration method, e. g. with cold water, to which a slight quantity of alcohol may be added. The amylopectin precipitate may be purified from MgSO₄ by washing with cold water.

It is known that the solubility of some colloids is influenced by salts; according to the extent of their influence the salts may be arranged in the so-called Hoffmeister series. The anions show an increasing effect in the series: iodine<chloride<acetate<tartrate<sulfate<citrate. With the cations this series is:

$$K < Na < Zn < NH_4 < Mg$$

In principle tartrates, sulfates and citrates of sodium and the metals placed behind sodium in the Hoffmeister series should have an influence on the solubility of starch in water.

However, in practice some difficulties arise if these salts are used for fractionating starch.

When carrying out the process, citrates proved to be less suitable than sulfates, presumably since, during the dissolving of starch in citrate-containing liquids, reactions between citrate and starch take place. Besides, the tartrates were less suitable than the corresponding sulfates, as is indeed in agreement with the place in the Hoffmeister series. Therefore sulfates are preferred for the fractionation process of the invention.

Of the sulfates zinc sulfate gives a less favourable result, as the pH of a zinc sulfate solution of the required concentration lies between 5.5 and 6; with this low pH very dark products are formed during dissolving, which cannot be sufficiently prevented by the addition of a slight quantity of a reducing agent, and, besides, with this pH at high temperature the starch is already rather considerably hydrolyzed.

The most favourable results were obtained with solutions of magnesium sulfate, and with solutions of ammonium sulfate or sodium sulfate and mixtures of two or three of these salts.

With sodium sulfate, however, a complication arises; owing to the relatively slight solubility of sodium sulfate at low temperature, on cooling a solution of starch in an aqueous sodium sulfate solution to a temperature at which the amylopectin separates, at the same time part of the sodium sulfate separates from the solution in the crystalline state. The separation of amylopectin and sodium sulfate by dissolving the salt in water is practicable, but time-consuming; the mother lye resulting from the separation of solid substance and liquid contains too little sodium sulfate to be used as such for dissolving a new quantity of starch.

However, without objections use can be made of a solution containing magnesium sulfate and sodium sulfate, in other words part of the magnesium sulfate can be replaced by sodium sulfate.

Ammonium sulfate has the favourable property that it is able to increase the dissolving velocity of starch at a high temperature. A drawback of the ammonium sulfate is that it causes darker colours at the dissolving of the starch than magnesium sulfate; however, this may be practically entirely avoided by the addition of a slight quantity of a reducing agent, such as sodium sulfite.

Mixtures of MgSO₄.7 aq. and (NH₄)₂SO₄ or of Na₂SO₄ and (NH₄)₂SO₄ can be used, and also mixed solutions of sodium sulfate, magnesium sulfate and ammonium sulfate can be used to advantage; in many cases it will be determined, also in view of the price, which of these three salts is principally used.

The temperature at which amylose and amylopectin are separated from the solution is influenced by the concentration and the mutual relation of these salts; discrepancies both in the yield of amylose and in its purity consequently occur in each separate case.

The separation temperatures of amylose and amylopectin from various solutions are indicated on Table I.

TABLE I

| Test, No. | Starch, g. per l. | MgSO₄.7 aq., g. per l. | (NH₄)₂SO₄, g. per l. | Na₂SO₄, g. per l. | Sep. temp. of amylose, °C. | Sep. temp. of amylopectin, °C. |
|---|---|---|---|---|---|---|
| 17 | 50 | | 200 | | ±40 | ±0 |
| 18 | 50 | | 100 | 70 | ±50 | ±10 |
| 19 | 50 | 152 | 32 | | ±20 | ¹ ±0 |
| 20 | 50 | 152 | | | ±40 | ±0 |
| 21 | 50 | | | 30 | ² ±20 | ±10 |
| 22 | 50 | 270 | | 180 | 60–70 | ±20 |
| 23 | 50 | 260 | | | 40–50 | ±10 |
| 24 | 50 | 250 | | | 20–30 | ±0 |
| 25 | 50 | 135 | 60 | 50 | 45–55 | 0–10 |
| 26 | 150 | 150 | | | 15–25 | ±0 |
| 27 | 50 | 50 | | | ³ ±20 | |

¹ Slowly.
² Dilution with an equal volume of water is required to prevent the Na₂SO₄ from crystallizing out; from this diluted solution the amylose separates only slowly and in a form in which it cannot easily be separated from the solution.
³ Cooling time 24 hours.

From this it appears that the separation temperature for amylose and amylopectin can be regulated by changing the quantity and mutual relation of the salts.

This temperature may further be influenced by the addition of small percentages of organic substances such as amyl alcohol and similar substances, which are able to precipitate amylose from an aqueous starch-solution.

The influence of different quantities of amyl alcohol and capryl alcohol on the quantity and the purity of the amylose fraction is indicated in Table II.

TABLE II

| Test No. | Starch, percent by weight | Alcohol | | MgSO4.7 aq., percent by weight | Dissolving temp., °C. | Amylose, percent by weight on starch | Amylose purity, percent | Amylopectin, percent by weight on starch |
|---|---|---|---|---|---|---|---|---|
| | | Type | Percent by volume | | | | | |
| 1 | 3 | | | 25 | 122 | 19.8 | ±60 | 64 |
| 2 | 3 | Amylalcohol | 1.2 | 25 | 122 | 26.7 | 90–95 | 70 |
| 3 | 3 | do | 1.0 | 25 | 122 | 26.2 | 90–100 | 68 |
| 4 | 3 | do | 0.5 | 25 | 122 | 24.5 | ±86 | 69 |
| 5 | 8 | do | 1.2 | 21 | 120 | 27.4 | | |
| 6 | 8 | do | 1.2 | 25 | 122 | 32.8 | 75–80 | 55 |
| 7 | 8 | do | 2.2 | 0 | 120 | 28.3 | 55 | |
| 8 | 3 | do | 1.2 | 30 | 122 | 19 | ±85 | |
| 9 | 3 | Caprylalcohol | 0.1 | 25 | 122 | 16.7 | ±90 | 78 |
| 10 | 3 | do | 0.035 | 25 | 122 | 18.3 | ±85 | 79 |

From tests Nos. 1, 2, 3 and 4 the influence of the addition of varying quantities of amyl alcohol to the solution of starch in an aqueous solution of magnesium sulfate is apparent. Amylose of maximal purity is precipitated from a solution, containing about 1% by volume of amyl alcohol besides 25% by weight of magnesium sulfate.

Amylose can also be separated from the aqueous solution by an addition of only 2.2% of amyl alcohol (test Number 7) but the purity of the product is much less than in test Nos. 5 and 6, where amylose is precipitated from a solution with the same content of starch but also containing magnesium sulfate.

On dissolving starch in water some degradation of the molecule takes place, as a result of which the molecular weight is decreased.

If the dissolving is accelerated for example by working in an autoclave at higher temperature this degradation is smaller, but at higher temperature dark-coloured products are formed during the dissolving process, especially if starch is dissolved in concentrated salt solutions, which products adversely affect the colour of the separated fractions, in particular if the process is carried out continuously, during which process starch is dissolved again in the mother lye. Therefore it has so far not been possible to process starch solutions for this purpose in aqueous salt solutions at temperatures exceeding 120° C. Even at this temperature, however, decomposition during dissolving has a noticeably unfavourable influence on the centrifugability of the fractions.

We supposed that this darking at higher temperature is the result of oxidative decomposition of the starch and tried to prevent this by working in a nitrogen atmosphere. Although some improvement was indeed obtained, the result was not satisfactory, while in addition the working costs are not inconsiderably higher than when working in air, as, before being led into the autoclave the starch solution has to be freed from oxygen by passing through nitrogen at boiling temperature for approximately 1 hour. If this does not happen, the filling of the autoclave with nitrogen has practically no influence whatever on the degree of darkening.

It was found that by adding reducing agents which are in themselves stable in an aqueous medium at the chosen dissolving temperature of the starch, even in a quantity which is considerably smaller than conforms with the quantity of oxygen present in the liquid and the autoclave, the darkening during dissolving at temperatures of 120° C. and higher can be nearly entirely prevented.

As suitable reducing agents, for example, sodium sulfite and sodium thiosulfate may be mentioned.

A 0.006% sodium sulfite concentration in the liquid was already found to be sufficient to prevent darkening, while when dissolving starch in a magnesium sulfate solution the quantity of oxygen in the system could bind a quantity of 0.05%.

This prevention of colouration is especially important if the starch fractionation is effected in a cycle and the mother lye from which the starch has been separated is used again for dissolving a new quantity of starch.

*Example I*

Solvent _____ An aqueous magnesium sulfate solution containing 270 g. MgSO4.7 aq. per litre.
Potato starch concentration _____ 50 g. per litre.
Heating temperature __ 160° C.
Heating period _____ 15 minutes.
pH _____ Kept between pH 7–8 by MgO.
RH _____ Kept constant by 0.05% sodium sulfite.

A series of experiments was made, whereby the mother lye remaining after cooling the solution ultimately to 20° C. and separating the precipitated polyose by centrifuging was used again as fractionating medium for the next experiment.

This treatment was repeated six times, so that with the sixth experiment use was made of a mother lye which had 5 times completed the total fractionating cycle.

The results of these experiments are shown in Table III.

TABLE III

| Test No. | pH before autoclave | pH after autoclave | RH before autoclave MV | RH after autoclave MV | Na2SO3, percent anhydrous | MgO, percent | Colour mother lye | Colour amylose | Colour amylopectin |
|---|---|---|---|---|---|---|---|---|---|
| 1 | 7.91 | 7.70 | +49 | +50 | 0.05 | 0.006 | Colourless | | |
| 2 | 7.60 | 7.70 | +41 | +50 | 0.05 | 0.006 | do | | |
| 3 | 7.60 | 7.50 | +51 | +55 | 0.05 | 0.006 | Very light grey | | |
| 4 | 7.53 | 7.16 | +40 | +22 | 0.05 | 0.006 | Light grey | | |
| 5 | 7.19 | 6.80 | +22 | +16 | 0.05 | 0.006 | do | White | White. |
| 6 | 7.12 | 7.50 | +28 | +23 | 0.05 | 0.006 | do | White | White. |

N. B. The number of decomposition products in the mother lye, after it has been used 6 times cooled to 20° C., and after 24 hours' standing, was ascertained in experiment No. 6 and proved to be 0.5%. This determination was made according to two independent methods, viz.:
(1) Gravimetrically, by drying and incinerating.
(2) Oxidimetrically, by oxidyzing with chromic acid and iodtmetric determination of the $O^2$ used by the process.
Both methods gave the same results.

From these results it appears that by adding a small quantity of sodium sulfite it is possible to keep the RH (redox potential) of the solution at a constant value during the dissolving process, and, consequently to prevent dark colours during dissolving under conditions where the degradation of the starch molecules is only very small.

Also if an aqueous solution of sodium sulfate or ammonium sulfate is used as fractionating liquid, a similar result was obtained by adding a reducing agent.

In this connection it may be remarked that ammonium sulfate causes much more darkening than magnesium sulfate and this colouration could not be entirely prevented.

Some other examples of a way, in which the process of the invention may be carried out with potato starch, defatted corn starch or defatted wheat starch, are given hereafter.

Example II

5% by weight of starch is dissolved at 125° C. in an autoclave in a solution containing 25 g. $MgSO_4.7$ aq. and 1 cc. amyl alcohol per 100 cc. solution by heating for about 2½ hours. On cooling unto about 90° C. the amylose precipitates almost quantitatively in a form, easily separable from the liquid with a separator and whereby the separation time amounts to only a few minutes.

On further cooling unto about 0° C. the amylopectin separates almost fully from the mother lye within a half hour, also in a well separable form. The remaining mother lye can be used again for dissolving starch.

Example III

8% by weight of starch is heated for 15 minutes at 160° C. in an autoclave with a solution containing 27% $MgSO_4.7$ aq., 0.03% MgO and 0.01% $Na_2SO_3$. On subsequent cooling unto 65° C. the amylose nearly fully precipitated. After removal of the A-fraction further cooling unto 15° C. was sufficient for the precipitation of the amylopectin.

Example IV

8% by weight of starch is heated in an autoclave at 160° C. for 5 minutes in a solution containing 20% by weight of $(NH_4)_2SO_4$, 0.03% MgO and 0.1% $Na_2SO_3$. On subsequent cooling to about 40° C. the amylose precipitated nearly fully, and this precipitate was easily separable from the liquid. After separation further cooling to about 0° C. for one hour was sufficient to precipitate the amylopectin.

Example V

15% by weight of starch is heated in an autoclave at 160° C. for about 30 minutes in a solution containing 15% by weight of $MgSO_4.7$ aq., 0.08% by weight of MgO and 0.1% $Na_2SO_3$.

On subsequent cooling of the solution to about 20° C. 70% of the amylose precipitates, and this precipitate contains about 80% amylose.

After separation of the precipitate from the solution, on further cooling of the solution to 0° C. the amylopectin precipitates and can be separated.

We claim:

1. The process of fractionating native starch into its amylose and amylopectin fractions which comprises dissolving from about 3% to about 20% of native starch by heating at a temperature exceeding about 115° C. and under pressure in an aqueous solution containing more than 5% by weight of a salt from the group consisting of magnesium, ammonium and sodium sulphates, cooling the solution to a temperature at which the amylose fraction precipitates but which is sufficiently high that the amylopectin fraction remains in solution, precipitating the amylose, separating said amylose fraction, further cooling the remaining solution to precipitate the amylopectin fraction and separating said amylopectin fraction from the mother lye.

2. Process according to claim 1, characterized in that 3-8% by weight of the starch is dissolved by heating under pressure in a solution containing 20-30 g. $MgSO_4.7$ aq. per 100 cc. solution.

3. Process according to claim 1, characterized in that 8-20% by weight of starch is dissolved by heating under pressure in a solution containing 12-30 g. $MgSO_4.7$ aq. per 100 cc. solution.

4. Process according to claim 1, characterized in that the starch is dissolved under pressure at a temperature from 120° C. to 160° C.

5. Process according to claim 1 characterized in that the starch is dissolved under pressure at a temperature of 150-160° C.

6. Process for fractionating native starch comprising dissolving from about 3% to about 20% by weight of native starch by heating under pressure at a temperature exceeding about 115° C. in an aqueous solution containing more than 5% by weight of a salt which is capable of precipitating starch from an aqueous solution of the class consisting of magnesium, ammonium and sodium sulfates and of from 0.001 to 1% of a reducing agent stable in water at the dissolving temperature, cooling the liquid to a temperature at which the amylose fraction precipitates but which is sufficiently high that the amylopectin fraction remains in solution, precipitating the amylose, separating said amylose from the mother lye, cooling the mother lye to a lower temperature until amylopectin precipitates, and separating said amylopectin from the liquid.

7. Process according to claim 6 characterized in that the remaining liquid is used for dissolving fresh starch.

8. Process for fractionating native starch comprising dissolving from about 3% to about 20% by weight of native starch by heating at a temperature exceeding about 115° C. under pressure in an aqueous solution containing more than 5% by weight of a salt which is capable of precipitating starch from an aqueous solution of the class consisting of magnesium, ammonium and sodium sulfates, and of from 0.01 to 5% by volume of an organic compound capable of precipitating amylose from an aqueous starch solution of the class consisting of amyl alcohol, capryl alcohol, butyl alcohol and di-isopropyl ketone, cooling the liquid to a temperature at which the amylose fraction precipitates but which is sufficiently high that the amylopectin fraction remains in solution, precipitating the amylose, separating said amylose from the mother lye, cooling further until amylopectin precipitates, and separating said amylopectin from the mother lye.

9. Process for fractionating native starch comprising dissolving from about 3% to about 20% by weight of starch by heating at a temperature exceeding about 115° C. under pressure in an aqueous solution containing more than 5% by weight of a salt which is capable of precipitating starch from an aqueous solution of the class consisting of magnesium, ammonium and sodium sulfates, of from 0.001 to 1% of a reducing agent stable in water at the dissolving temperature, and of from 0.01 to 5% of an organic compound capable of precipitating amylose from an aqueous starch solution of the class consisting of amyl alcohol, butyl alcohol and capryl alcohol, and di-isopropyl ketone, cooling the liquid to a temperature at which the amylose fraction precipitates but which is sufficiently high that the amylopectin fraction remains in solution, precipitating the amylose, separating said amylose from the mother lye, cooling further until the amylopectin precipitates, and separating said amylopectin from the mother lye.

10. Process for fractionating native starch comprising dissolving from about 3% to about 20% by weight of native starch at a temperature exceeding about 115° C. under pressure in an aqueous solution containing more than 5% by weight of at least two compounds from the group consisting of magnesium sulfate, ammonium sulfate and sodium sulfate, cooling the liquid to a temperature at which the amylose fraction precipitates but which is sufficiently high that the amylopectin fraction remains in solution, precipitating the amylose, separating said amylose from the liquid, cooling further until amylopectin precipitates, and separating said amylopectin from the mother lye.

11. A process for fractionating native starch comprising dissolving between about 3 and 20% by weight of native starch by heating at a temperature exceeding about 115° C. and under pressure in an aqueous solution containing about 25% magnesium sulfate .7 aq. and about 1% of amyl alcohol, cooling said liquid to a temperature at which the amylose fraction precipitates, but which is sufficiently high that the amylopectin fraction remains in solution, separating said amylose from the mother lye and cooling further until amylopectin precipitates, and separating said amylopectin from the mother lye.

References Cited in the file of this patent

UNITED STATES PATENTS

| | | |
|---|---|---|
| 2,001,925 | Thurher | May 21, 1935 |
| 2,014,799 | Fuller | Sept. 17, 1935 |
| 2,052,320 | Sjostrom | Aug. 25, 1936 |
| 2,515,095 | Schoch | July 11, 1950 |
| 2,515,096 | Schoch | July 11, 1950 |

FOREIGN PATENTS

| | | |
|---|---|---|
| 5,844 | Great Britain | 1896 |

U. S. DEPARTMENT OF COMMERCE
PATENT OFFICE

CERTIFICATE OF CORRECTION

Patent No. 2,829,987     Willem Christiaan Bus et al.     April 8, 1958

It is hereby certified that error appears in the printed specification of the above numbered patent requiring correction and that the said Letters Patent should read as corrected below.

Column 1, line 44, for "mixutres" read -- mixtures --; column 3, line 17, for "use for" read -- used for --; columns 5 and 6, Table III, in the heading to the sixth column, first line thereof, for "Na2SO3" read -- $Na_2SO_3$ --; same table, last column thereof, opposite Test No. 1, 2, 3, and 5, insert leaders; same table, printed matter under the table, fifth line thereof, for "O2" read -- $O_2$ --.

Signed and sealed this 27th day of May 1958.

(SEAL)
Attest:
KARL H. AXLINE
Attesting Officer

ROBERT C. WATSON
Commissioner of Patents